FIG. 1

INVENTOR
E. E. FRANZ
BY
E.R. Nowlan
ATTORNEY

Nov. 29, 1949  E. E. FRANZ  2,489,878
LOADING MACHINE WITH ROTATABLE TURRET HAVING
FLEXIBLE RECEPTACLE SUPPORTS AND RECEPTACLE
ENGAGED VALVE ACTUATORS
Filed July 26, 1944  6 Sheets-Sheet 2

FIG. 2

INVENTOR
E. E. FRANZ
BY
E. R. Nowlan
ATTORNEY

Nov. 29, 1949

E. E. FRANZ

2,489,878

LOADING MACHINE WITH ROTATABLE TURRET HAVING
FLEXIBLE RECEPTACLE SUPPORTS AND RECEPTACLE
ENGAGED VALVE ACTUATORS

Filed July 26, 1944

INVENTOR
E. E. FRANZ

BY

E. R. Norman

ATTORNEY

Nov. 29, 1949 E. E. FRANZ 2,489,878
LOADING MACHINE WITH ROTATABLE TURRET HAVING
FLEXIBLE RECEPTACLE SUPPORTS AND RECEPTACLE
ENGAGED VALVE ACTUATORS
Filed July 26, 1944 6 Sheets-Sheet 5

INVENTOR
E. E. FRANZ
BY
E. R. Nowlan
ATTORNEY

Nov. 29, 1949 E. E. FRANZ 2,489,878
LOADING MACHINE WITH ROTATABLE TURRET HAVING
FLEXIBLE RECEPTACLE SUPPORTS AND RECEPTACLE
ENGAGED VALVE ACTUATORS
Filed July 26, 1944 6 Sheets-Sheet 6

INVENTOR
E. E. FRANZ
BY
E. R. Nowlan
ATTORNEY

Patented Nov. 29, 1949

2,489,878

UNITED STATES PATENT OFFICE 2,489,878

LOADING MACHINE WITH ROTATABLE TURRET HAVING FLEXIBLE RECEPTACLE SUPPORTS AND RECEPTACLE ENGAGED VALVE ACTUATORS

Erwin E. Franz, Cranford, N. J., assignor to Western Electric Company, Incorporated, New York, N. Y., a corporation of New York Application July 26, 1944, Serial No. 546,708

7 Claims. (Cl. 226—97)

1

This invention relates to loading machines, and more particularly to machines for potting electrical units.

In the manufacture of certain electrical units such as coils of particular types, metallic casings, commonly known as cans, are provided to house the coils or given portions thereof, the casings being filled with an insulating compound.

An object of the invention is to provide a loading machine which is simple in structure, efficient in operation, and highly practical for loading electrical units.

With this and other objects in view, the invention comprises a support for a hollow article movable in a given path, means under the control of the article to fill the article with a sealing material, and means to control the cooling of the material.

Other objects and advantages will be apparent from the following detailed description when considered in conjunction with the accompanying drawings, wherein.

Figure 1:
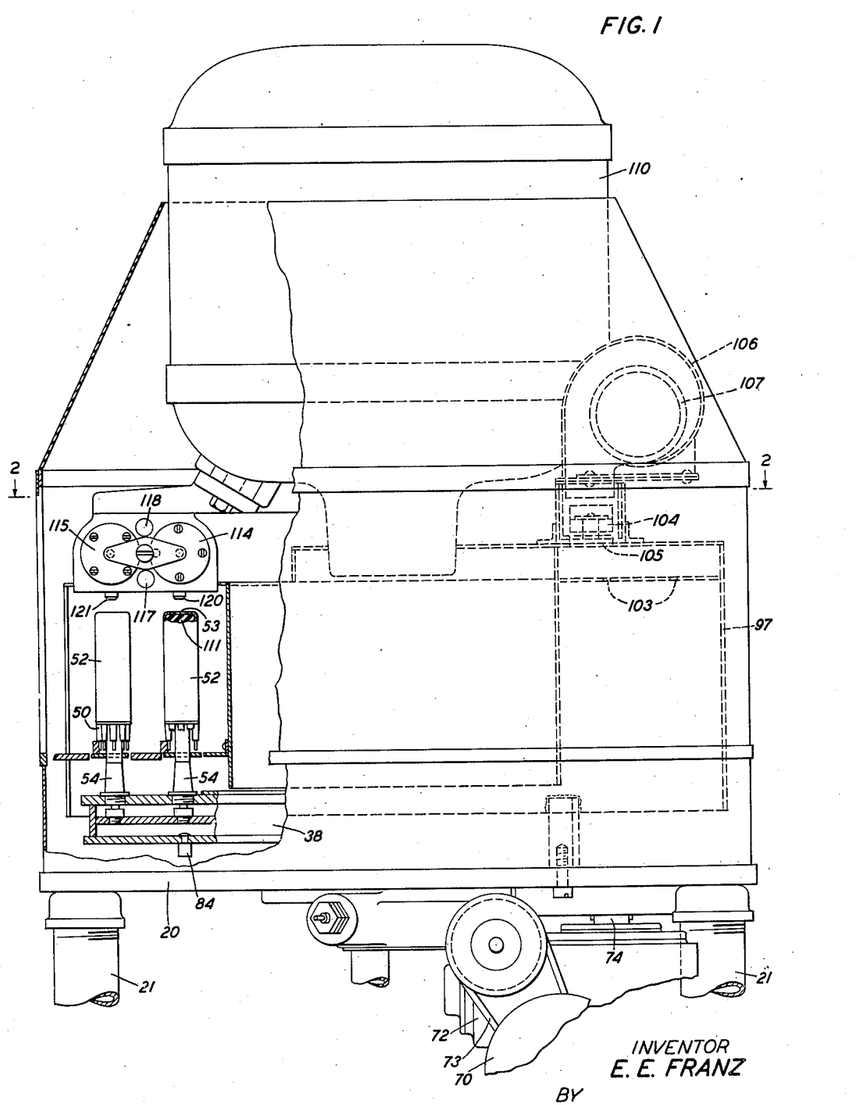
Fig. 1 is a side elevational view of the apparatus, portions thereof being broken away.
Figures 3, 10:
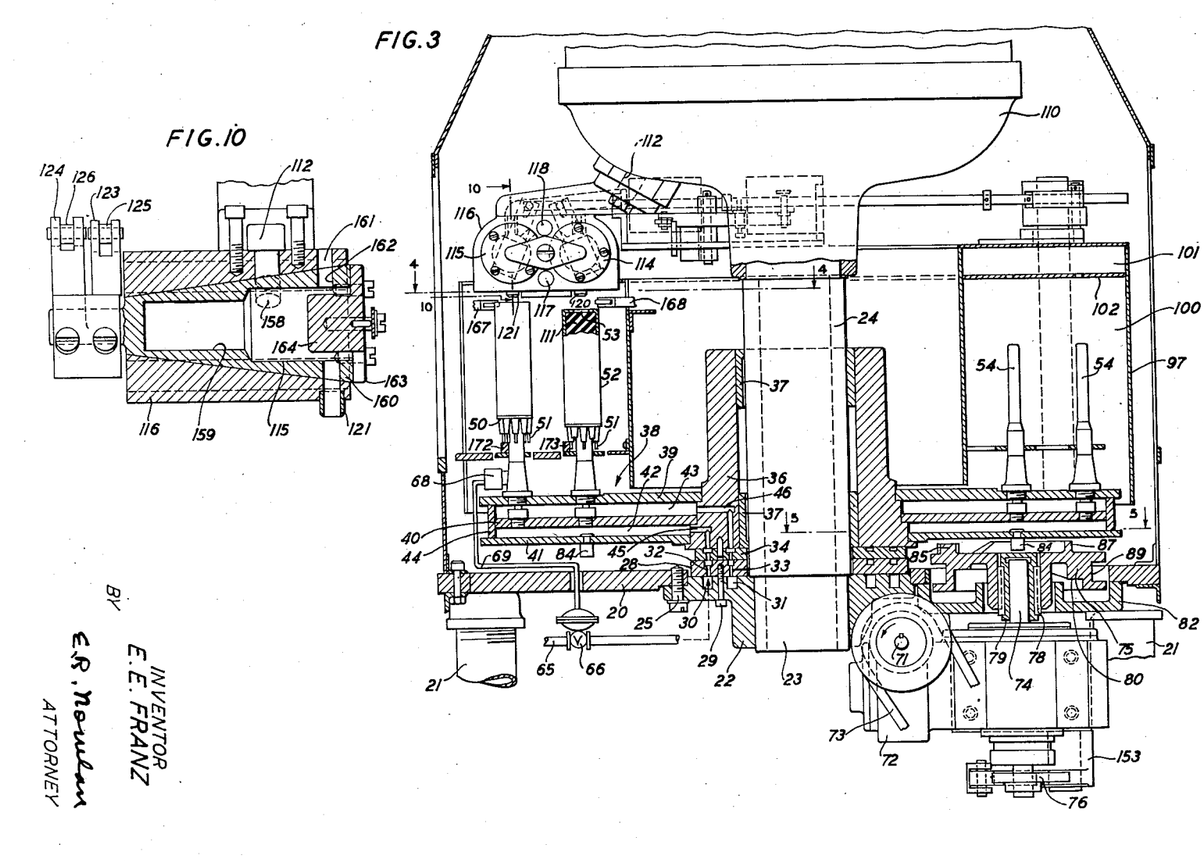
Fig. 3 is a fragmentary vertical sectional view taken substantially along the line 3—3 of Fig. 2.
Fig. 10 is an enlarged fragmentary sectional view taken along the line 10—10 of Fig. 3.

Referring now to the drawings, attention is first directed to Figs. 1 and 3, which illustrate a base 20 supported by suitable legs 21 and centrally apertured to receive a supporting bracket 22. A reduced end 23 of a stationary shaft 24 is supported in the central aperture of the bracket 22, the latter being fixedly mounted in the aperture of the base 20 by means of screws 25. An annular apertured plate 28, disposed concentric with the shaft 24, rests upon the bracket 22 and is fixed thereto as at 29. Annular grooves 30 and 31 are

2 formed in the bracket 22 in registration with sets of apertures 32 and 33 in the annular plate 28. A similar annular member 34, with like apertures therein, as shown in Fig. 3, for communication with their respective apertures 32 and 33, is also disposed concentric with the shaft 24 and is fixed to a hub 36. The hub 36 includes bearings 37 and is rotatable on the shaft 24. The hub is a part of a turret indicated generally at 38 and having an upper member 39, an intermediate member 40, and a lower member 41. Through the aid of these members compartments 42 and 43 are formed, closed at the outer edges thereof through the aid of an annular member 44. By viewing Fig. 3, it will be noted that sets of passageways 45 and 46 complete communication with their respective sets of apertures in the annular plate 28 and annular member 34.

Figure 2:
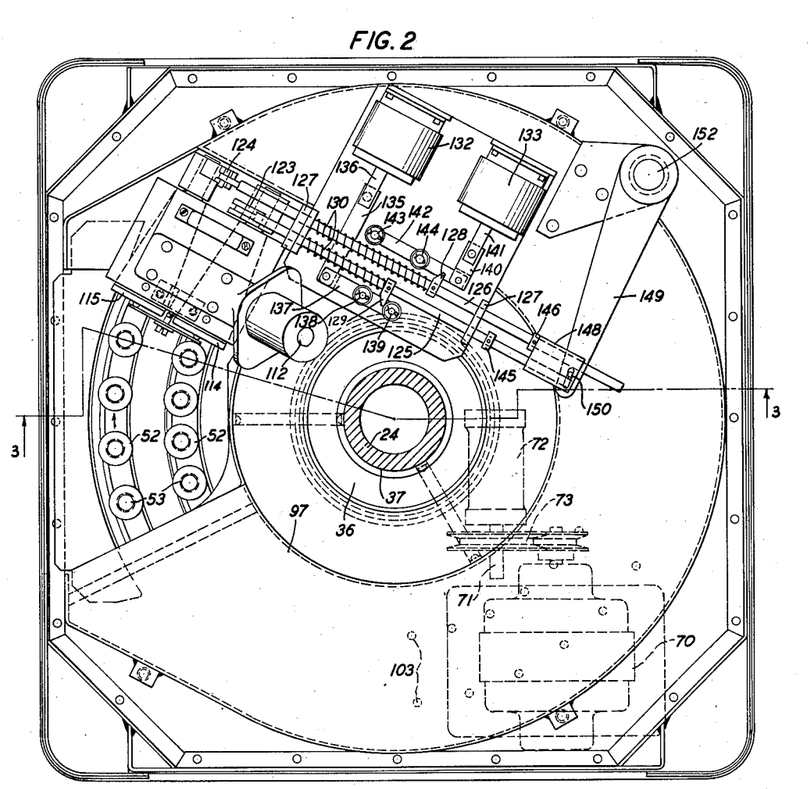
Fig. 2 is a horizontal sectional view taken substantially along the line 2—2 of Fig. 1.
Figure 4:
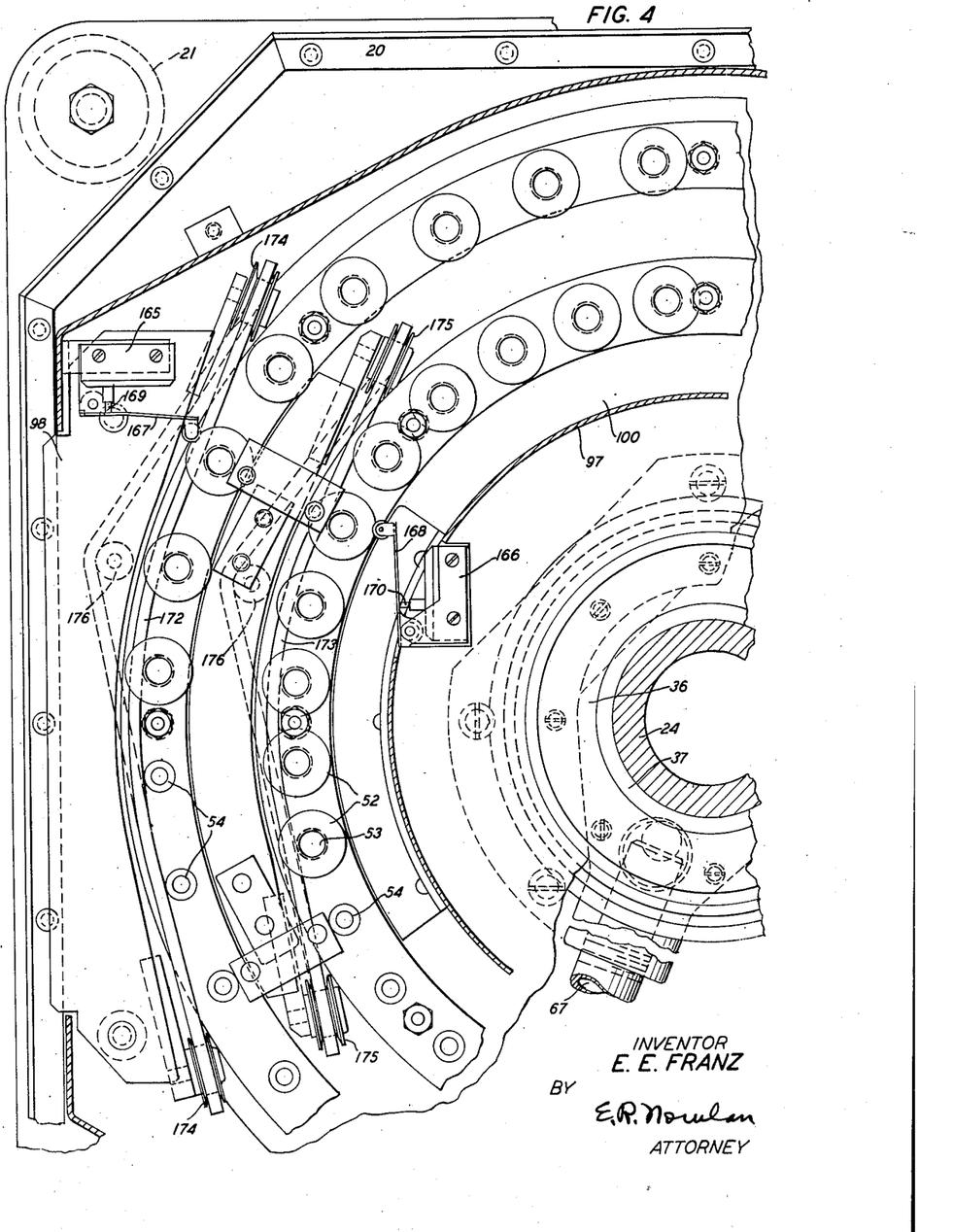
Fig. 4 is an enlarged fragmentary sectional view taken along the line 4—4 of Fig. 3.

In the present embodiment the electrical unit includes a molded body 50 supporting a plurality of terminals and having coils or other structures formed thereon, the leads of which are fixed to their respective terminals 51. A metallic can or container 52 is disposed over the upper portions of the body 50 and the inner structure of the unit, an aperture 53 being provided in the upper end of the container. The bodies 50 are hollow for given portions of their lengths to receive supports 54. The supports 54 are identical in structure, there being provided a multiplicity of pairs thereof disposed in circular arrangement as illustrated in Figs. 2 and 4.

Figure 9:
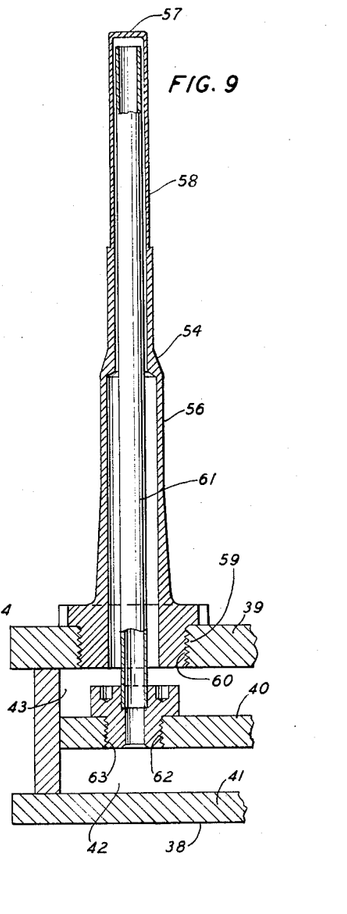
Fig. 9 is an enlarged fragmentary vertical sectional view of one of the unit supports.

Attention is directed to Fig. 9 for the detailed structure of the supports 54. The support illustrated in this figure is hollow and of the cross-sectional contour shown, closed at its upper end 57, upon which the body 50 rests, and including a thin-walled upper portion 58 and a larger lower portion 56, the latter being threaded at 59 and disposed in a threaded aperture 60 of the upper member 39 of the turret. A tubular member 61, supported in a threaded element 62, mounted in a threaded aperture 63 of the intermediate member 40, extends into the support 54 short of the full length thereof and spaced from the inner wall of the member to allow for the passage of a cooling fluid therebetween. The tubular member 61, therefore, communicates with the compartment 42, while the support 54 communicates with the compartment 43.

In potting electrical units, that is, in filling cans or containers thereof with a sealing compound, which is poured into the container in a molten state and allowed to cool, there exist fissures or other pockets in the material due to cooling and solidifying thereof. If such materials are allowed to cool normally without any controlling factor, the heat thereof will be expelled through the metal container and the material will, therefore, begin its solidification adjacent the container, resulting in the presence of the fissures adjacent to the core or central portion of the unit in which the members to be sealed are disposed. With the knowledge of these facts, the turret 38 is constructed as previously described, so that a cooling medium such as water may be circulated therethrough and through each of the supports 54, to cause the cooling of the sealing material toward the center of each unit, other means for retarding the cooling of the material nearer the container, such as by the application of heat to the container, being hereinafter described.

The cooling medium or water may be received from a supply line 65 through a thermostatically controlled valve 66 to the groove 30. The water, when admitted under force to the groove 30, will travel through the companion apertures in the members 28 and 34, through the passageways 45, into the compartment 42, through the tubular member 61 of each of the supports 54, overflowing at the upper ends thereof and passing downwardly, contacting the thin walls 58 and escaping through the compartment 43, passageways 46, through the companion apertures in the annular members 34 and 28, through the annular groove 31, and through an outlet 67 shown in Fig. 4. A control unit 68, positioned to successively engage the outer supports 54 during their intervals of rest, functions through the connection 69 in controlling the valve 66.

Figure 7:
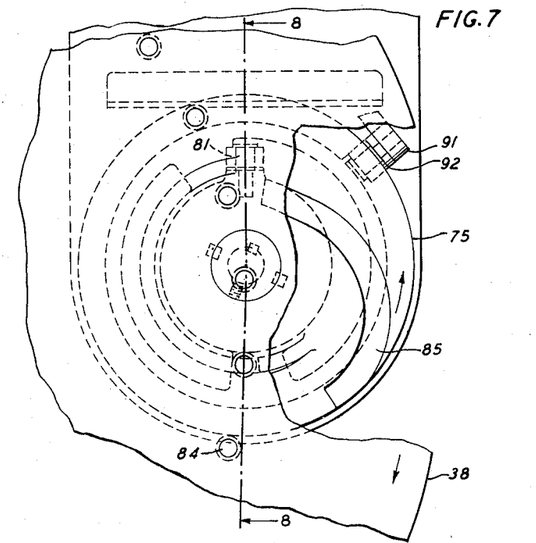
Fig. 7 is a fragmentary top plan view of a portion of the structure shown in Fig. 5 but with the cam portions in different positions.
Figure 8:
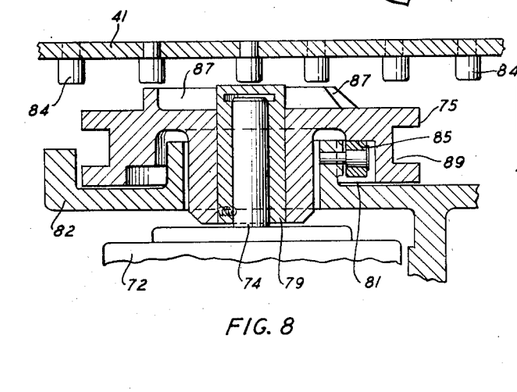
Fig. 8 is a fragmentary sectional view taken along the line 8—8 of Fig. 7.

Means is provided to intermittently move the turret 38 about the fixed shaft 24 and to lock it against movement during its intervals of rest. The moving means includes a motor 70 (Fig. 2) which is operatively connected to an input shaft 71 of a speed reducing unit 72 through a belt and pulley connection 73. An output shaft 74 of the unit 72 extends vertically and has a cam element 75 mounted upon the upper end thereof and a cam 76 mounted upon the lower end thereof. The cam element 75 is keyed, as at 78, to a sleeve 79, the latter being fixed to the shaft. The purpose of this connection is to allow the cam element 75 to be moved vertically into and out of operative positions under the control of a cam surface 80 positioned to ride upon a cam roller 81, the latter being supported by a cup-shaped structure 82 fixedly supported by the base 20. A circular arrangement of pins 84 are disposed at spaced positions in alignment with the inner circle of supports 54, to function in cooperation with a cam member 85, of the contour shown in Figs. 5 and 7, for the movement of the turret a given distance, namely the distance between the centers of the pins 84, to advance the supports 54 one station during each cycle of the cam element 75. There is also provided a cam portion 87 of the contour illustrated in Figs. 3, 5 and 8, positioned to ride under the adjacent pin 84 during each cycle of the cam element 75 to force the latter downwardly should it not move downwardly by gravity under the control of the roller 81.

A cam groove 89 is formed in the periphery of the cam element 85 and of a contour to cause rocking of a toggle lever 91 through the riding of its cam roller 92 in the cam groove. The lever 91 (Fig. 5) is pivotally supported, at 93, and has a U-shaped member 94 at the other end thereof positioned to be moved into engagement with the adjacent pin 84 at the termination of each intermittent movement of the turret. In this manner the turret is locked against rotary movement during the rest period thereof, so as to automatically align the apertures 53 of the containers 52 with the nozzles of the units or valves for feeding the sealing material thereto, as will hereinafter be described.

A hood 97, arcuate in general contour, surrounds the supports 54 excepting at the loading position at the front of the machine, indicated at 98 (Fig. 4), where the units, to be filled, are placed upon the supports 54 and those which have been filled and passed through the machine may be removed. The hood 97 has a main compartment 100 and an auxiliary compartment 101 separated by a partition 102 in which a series of apertures 103 (Figs. 1, 2 and 3) are disposed in circular arrangement throughout the partition. A heating unit 104, which may be of any desired contour, is positioned adjacent an inlet 105 for the compartment 101, so that air from a blower 106 actuated by an electric motor 107 may be heated while passing into the compartment. The partition with its apertures 103 distributes the heated air throughout the compartment 101 and causes it to pass uniformly into the compartment 100 to heat the containers 52.

A receptacle 110 for sealing material 111 is rigidly mounted upon the shaft 24 and has an outlet 112. Suitable means (not shown) may be provided to heat the material 111 in the receptacle 110 to convert it into a liquid so that it will flow freely through the outlet 112 to valves 114 and 115. The valves are disposed in a housing 116 which includes a heating element, indicated generally at 117, which is under the control of a thermostat 118 to maintain the valves and the material at a desired temperature. Outlets or nozzles 120 and 121 are provided for the valves 114 and 115, respectively, and are positioned to register with units during each interval of rest of the turret 38. The valves 114 and 115 are identical in structure and hollow as illustrated in Fig. 10. The means for actuating the valves is illustrated in Figs. 2, 3 and 10. The valves 114 and 115 have levers 123 and 124 fixed to their outer ends, they in turn being pivotally connected to the adjacent ends of actuating rods 125 and 126, respectively. These rods are slidably supported in suitable bearings 127 and carry cam-like fingers 128 and 129. Springs 130, disposed concentric with the rods between one of the bearing members 127 and their fingers 128 and 129, normally urge the rods to the right, to cause movement of the valves into open positions. Solenoids 132 and 133 are provided to release the actuating rods 125 and 126, they functioning in cooperation with the fingers 128 and 129.

Figure 5:
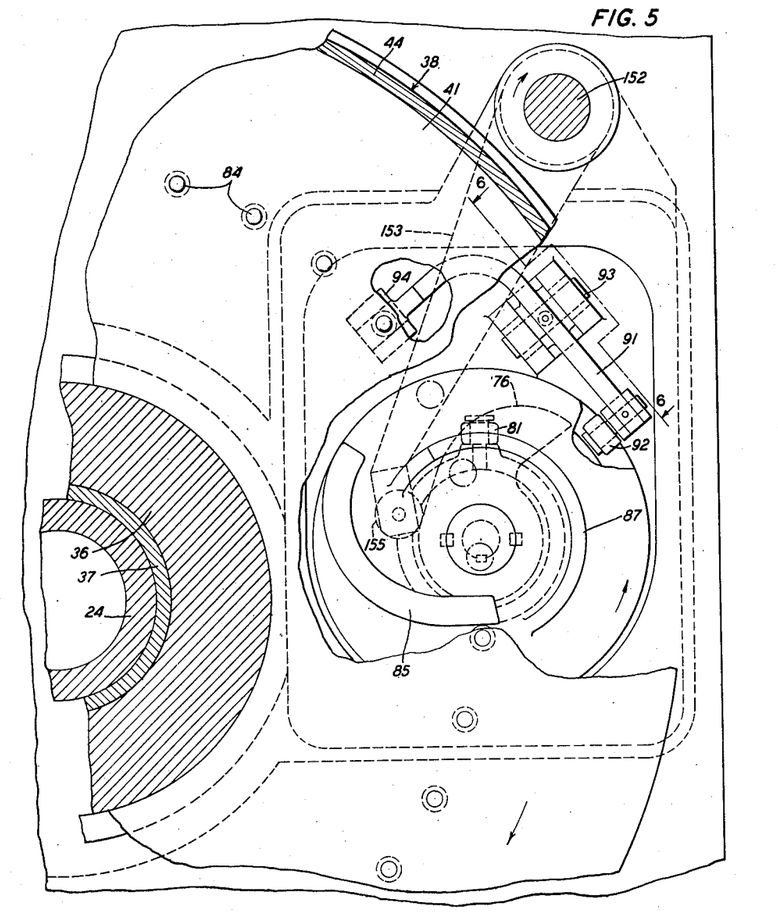
Fig. 5 is an enlarged fragmentary sectional view taken substantially along the line 5—5 of Fig. 3.

The solenoid 132 has a link 135 connecting its spring pressed core 136 to a lever 137, the latter being pivotally supported at 138 and carrying a roller 139 at its outer end, as illustrated in Fig. 2. When the core of the solenoid 132 is in its normal position the roller 139 is in the path of the finger 129 to hold the actuating rod 125 in a position to the left, the roller 139 being removed from the path of the finger upon energization of the solenoid. A similar structure is provided for the solenoid 133, including a link 140 connecting its spring pressed core 141 with a lever 142, the latter being pivotally supported at 143 and carrying a roller 144. The roller 144 is positioned in the path of the finger 128 to hold the finger, together with its actuating rod 126, to the left against the force of its spring 130 until the solenoid 133 is energized. The actuating rods 125 and 126 have collars 145 and 146 at given positions thereon positioned to be engaged by a slide 148, carried by the rods and movable through the actuation of an arm 149, which is connected to the slide through the aid of a pin or screw 150 receivable in an elongate aperture in the end of the arm. The arm 149 is fixedly mounted upon the upper end of a shaft 152 which is supported in suitable bearing and extends downwardly to a position beneath the base 20, where a cam lever 153 is mounted thereon. The cam lever 153 is shown in Figs. 3 and 5 and carries a cam roller 155, at its outer end, which is normally held in engagement with the cam 76 so that during each revolution of the cam, the cam lever 153 will be moved clockwise to move the arm 149 (Fig. 2) in the same direction, to move the slide 148 to force either or both of the actuating rods 125 and 126 so that their fingers 128 and 129 will engage their respective rollers 139 and 144. The cam-like surfaces of the fingers cause actuation of their levers 137 and 142 in movement into their set positions. This is, therefore, the setting mechanism for the valves 114 and 115. When the valves are set, passageways 158 communicate with the passageway 112 leading from the receptacle 110, so that a hollow portion 159 (Fig. 10) of each of the valves may be filled with the sealing material. At this time outlet passageways 160 are closed to their nozzles 120 and 121. Ports 161 are provided for each of the valves 114 and 115, they having pairs of ports 162 to communicate with the ports 161 while the valves are in their respective loading and unloading positions, so that air within the valves may escape during the loading of the valves with the sealing material, and permit air to enter the valves during the unloading of the material into the units so that the liquid material which remains heated in the valves will be allowed to flow freely through the nozzles associated therewith. It will be noted that the larger ends of the valves are closed by covers 163 including integral plug portions 164 (Fig. 10) which may be of varied sizes to vary the volume of the sealing material receivable into the hollow portions 159.

It is important that the valves 114 and 115 are operated to allow their contents of sealing material to pass into the containers 52 as the units are successively positioned therebeneath. It is equally important that the valves remain inoperative should the operator, by accident, allow a filled unit to repeat its cycle of movement through the machine. To assure accurate operation of the valves, micro-switches 165 and 166, respectively disposed in circuits (not shown) for controlling their respective solenoids 132 and 133 are mounted so that their roller carrying arms will be actuated by the units to be filled but will not be actuated by the units repeating their travel through the machine. The roller carrying arms for the switches are indicated at 167 and 168 and are movable to actuate their respective spring pressed plungers 169 and 170. The positioning of the hollow articles or electrical units relative to the switch arms 167 and 168 is under the control of flexible and extensible endless belts 172 and 173 supported by sheaves 174 and 175, the upper portions of the belts, due to the positioning of the sheaves, being caused to engage a plurality of the supports 54, while the lower portions thereof are held out of the path of the pins 84 through the aid of idler rollers or sheaves 176. It will, therefore, be apparent that when the operator places units to be filled upon the supports 54 at the loading position 98, certain of the terminals 51 of each of the units will rest upon their respective belt 172 or 173, as indicated at the left (Fig. 3). By resting upon the belt, the upper end of the unit will be in the path of its respective arm 167 or 168 to cause actuation of its switch. However, if the unit is one which has travelled through the machine and has previously been filled with the sealing material, as illustrated by the unit at the right of Fig. 3, this unit, after passing its respective switch arm 168 during its first travel through the machine, has dropped off of its belt 173 so that as it again approaches the belt, it will be in the lower position with the terminals 51 engaging the side wall of the belt and not resting upon the belt as shown. This difference in position of the unit will locate the upper end thereof beneath its switch arm 168 so that at this time the valve 114 will not be actuated as the solenoid 132 will not be energized. This same incident could occur in connection with the outer belt 172 and regardless of the number of units repeating their travel through the machine they will not interfere with the unfilled units.

Considering now the operation of the apparatus, let it be assumed that the machine is empty of units to be filled. The operator, stationed at the loading position 98 (Fig. 4), places the electrical units upon all of the supports 54, that is, both circular rows thereof, as they are brought into the loading position. The units, therefore, originally rest upon their respective belts 172 and 173 and as they reach their respective switch arms 167 and 168, the switches 165 and 166 are closed, causing energization of the solenoids 132 and 133. It is immaterial as to when the solenoids are actuated with respect to each other. They may be actuated simultaneously or at different intervals of time, depending upon the positions of the units on the turret.

Figure 6:
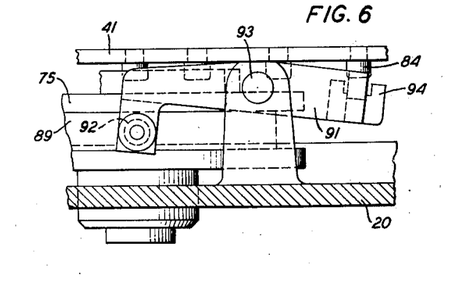
Fig. 6 is a fragmentary sectional view taken along the line 6—6 of Fig. 5.

Assuming that the valves 114 and 115 have been previously filled with the quantities of sealing material, these quantities will be deposited in their respective units, during the rest period of the turret, resulting from the energization of the solenoids to actuate their respective levers and release the fingers 128 and 129 so that the springs 130 may actuate the valves, opening the passageways to their nozzles so that their contents may flow into the containers of the units positioned beneath. This operation continues during the intermittent rotation of the turret which is brought about through the continuous operation of the motor 70 to drive its cam element 75 through the unit 72, to raise the element intermittently so that the cam member 85 will be positioned to engage the next succesive pin 84 to rotate the turret 38 a given distance, the turret being immediately locked against further rotation through the actuation of the cam lever 91 (Figs. 5 and 6). The cam element 75 is designed to move by gravity downwardly under the control of the cam roller 81 (Fig. 5) but if anything should cause the cam element to remain in its upper position, the cam portion 87 will engage an adjacent pin 84 and thus force the cam element downwardly.

During the operation of the unit 72, driven by the motor 70, the cam 76 travels with the cam element 75 through the operating cycles to repeatedly reset the valves 114 and 115. This is brought about through the actuation of the cam, lever 153 and its shaft 152, to actuate the arm 149 and the slide 148.

During the operation of the machine the air from the blower 106, heated by the heating unit 104, is constantly circulated through the hood 97 to heat the containers 52 of the units being filled to control the solidification of the sealing material so that, through the cooling effect of the supports 54 resulting from the cooling medium or water, the sealing material will cool more rapidly adjacent its center than at the outer portions thereof.

Although specific improvements of the invention have been shown and described, it will be understood that they are but illustrative and that various modifications may be made therein without departing from the scope and spirit of this invention as defined by the appended claims.

What is claimed is:

1. A loading machine comprising a turret, a circular arrangement of supports for hollow articles disposed at spaced positions thereon, means to intermittently rotate the turret to move the supports and articles thereon in a circular path, a flexible member disposed above the turret at a loading position to hold the articles in elevated positions when initially placed on their supports and during given portions of their circular movement, a receptacle for a supply of material, feeding means actuable to cause quantities of the material to flow successively into the elevated articles to load the articles therewith, and an element positioned a given distance above the turret and actuable by the elevated articles to cause operation of the feeding means.

2. A loading machine comprising a turret, a circular arrangement of supports for hollow articles disposed at spaced positions thereon, means to intermittently rotate the turret to move the supports and articles thereon in a circular path, a flexible member disposed above the turret at a loading position to hold the articles in elevated positions when initially placed on their supports and during given portions of their circular movement, a receptacle for a supply of material, feeding means actuable to cause quantities of the material to flow successively into the elevated articles to load the articles therewith, and an element positioned a given distance above the turret and actuable by the elevated articles to cause operation of the feeding means, the said flexible member being movable laterally by a loaded article on its support, whereby the loaded article may repeat its movement past the feeding means free of the element.

3. A loading machine comprising a turret, a circular arrangement of supports for hollow articles disposed at spaced positions thereon, means to intermittently rotate the turret to move the supports and articles thereon in a circular path, an endless flexible conveyor member, rollers to support the flexible member for movement of a portion thereof with the turret, which portion travels above the turret and normally frictionally engages a plurality of the supports adjacent a loading position to hold the articles in elevated positions when initially placed on their supports, a receptacle for a supply of material, feeding means actuable to cause quantities of the material to flow successively into the elevated articles to load the articles therewith, and an element positioned a given distance above the turret and actuable by the elevated articles to cause operation of the feeding means.

4. A loading machine comprising a turret, a circular arrangement of supports for hollow articles disposed at spaced positions thereon, means to intermittently rotate the turret to move the supports and articles thereon in a circular path, an endless flexible conveyor member, rollers to support the flexible member for movement of a portion thereof with the turret, which portion travels above the turret and normally frictionally engages a plurality of the supports adjacent a loading position to hold the articles in elevated positions when initially placed on their supports, a receptacle for a supply of material, feeding means actuable to cause quantities of the material to flow successively into the elevated articles to load the articles therewith, and an element positioned a given distance above the turret and actuable by the elevated articles to cause operation of the feeding means, the said flexible member being movable laterally by a loaded article on its support, whereby the loaded article may repeat its movement past the feeding means free of the element.

5. A loading machine comprising a turret, a circular arrangement of supports for hollow articles disposed at spaced positions thereon, means to intermittently rotate the turret to move the supports and articles thereon in a circular path, a flexible member disposed above the turret at a loading position to hold the articles in elevated positions when initially placed on their supports and during given portions of their circular movement, a receptacle for a supply of material, a dispensing element, having a chamber, movable between a charging position in communication with the receptacle and a discharging position above the said path, means normally urging the element to the discharging position, a latch to hold the element in the charging position, means operable in synchronism with the turret moving means to move the element to the charging position, and means under the control of the article in the elevated position adjacent the element to release the latch.

6. A loading machine comprising a turret, a circular arrangement of supports for hollow articles disposed at spaced positions thereon, means to intermittently rotate the turret to move the supports and articles thereon in a circular path, a flexible member disposed above the turret at a loading position to hold the articles in elevated positions when initially placed on their supports and during given portions of their circular movement, a receptacle for a supply of material, a dispensing element, having a chamber, movable between a charging position in communication with the receptacle and a discharging position above the said path, means normally urging the element to the discharging position, a latch to hold the element in the charging position, means operable in synchronism with the turret moving means to move the element to the charging position, a switch actuable into closed position by an article moved beneath the element, and a solenoid energized by the closing of the switch to trip the latch.

7. A loading machine comprising a turret, supports for hollow articles disposed at spaced positions thereon, means to intermittently rotate the turret to move the supports in a circular path, a receptacle for a supply of heated material, feeding means actuable to cause quantities of the material to flow successively into the articles, an element positioned to be engaged successively by the articles to cause actuation of the said feeding means, and a flexible member normally disposed closely adjacent the supports at and in advance of the element for unfilled articles to rest thereon in positions to successively engage the element, the articles when filled being carried by their supports and moved off the flexible member to a lower level to flex the flexible member outwardly of said supports and thereby moved to a position out of engagement with said element.

ERWIN E. FRANZ.

REFERENCES CITED

The following references are of record in the file of this patent:

UNITED STATES PATENTS

| Number | Name | Date |
|---|---|---|
| 280,478 | Hunter et al. | July 3, 1883 |
| 1,036,778 | Baker | Aug. 27, 1912 |
| 1,346,948 | Freedman | July 20, 1920 |
| 1,366,116 | Capell | Jan. 18, 1921 |
| 1,487,414 | Weatherhead | Mar. 18, 1924 |
| 1,570,151 | Holmquist | Jan. 19, 1926 |
| 1,795,312 | Mojonnier et al. | Mar. 10, 1931 |
| 1,893,831 | Weber | Jan. 10, 1933 |
| 2,049,722 | Phillips et al. | Aug. 4, 1936 |
| 2,131,181 | Kantor | Sept. 27, 1938 |
| 2,169,573 | Vogt | Aug. 15, 1939 |
| 2,176,121 | Burnett | Oct. 17, 1939 |
| 2,253,903 | Hagemeyer | Aug. 26, 1941 |
| 2,347,421 | Little | Apr. 25, 1944 |
| 2,364,415 | Arnold et al. | Dec. 5, 1944 |